(No Model.)

M. M. BEEMAN.
NUT LOCK.

No. 270,372. Patented Jan. 9, 1883.

WITNESSES

INVENTOR.

Marcus M. Beeman

UNITED STATES PATENT OFFICE.

MARCUS M. BEEMAN, OF SYRACUSE, NEW YORK.

NUT-LOCK.

SPECIFICATION forming part of Letters Patent No. 270,372, dated January 9, 1883.

Application filed April 3, 1882. (No model.)

*To all whom it may concern:*

Be it known that I, MARCUS M. BEEMAN, of Syracuse, Onondaga county, New York, have invented a new and useful Improvement in Nut-Locks, of which the following is a specification, reference being had to the accompanying drawings, in which—

Figure 1:
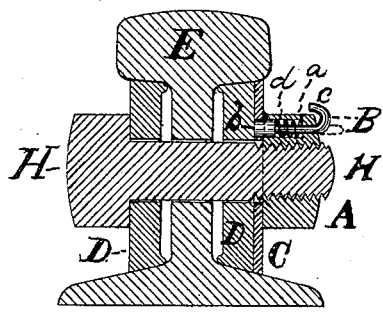
Figure 3:
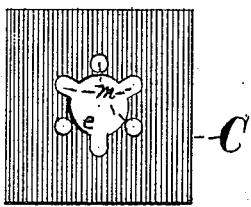
Figure 2:
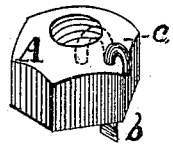

Figure 1 is a perpendicular transverse section thereof as applied to a fish-plate joint; Fig. 2, a perspective view of the nut; Fig. 3, a top plan view of the washer.

My invention relates to that kind of lock-nuts which contain in themselves a device for securely locking the nut when screwed up, and which can be readily unlocked.

It consists in the insertion of a hook-headed externally-projecting spring-bolt perpendicularly through the body of the nut from one face to the other, the projecting end of the inner portion of the bolt fitting into one of a series of holes or slots in a rectangular washer, the hook-shaped external head furnishing a ready means for unlocking the nut when locked, and holding back the locking-bolt as desired, and so keeping the nut unlocked.

It is constructed as follows:

A is the nut.

B is the spring locking-bolt, inserted in a recessed aperture extending perpendicularly through the nut from one face to the other. This is constructed with a shank, a, an internal head, b, and an external hook or hook-shaped head, c, and with the spring d around the shank. The internal head, b, may be made of plain cylindrical form, or with one side beveled off, as shown in the drawings, somewhat similar to a spring latch-bolt. The hook c is made by bending over the outer end of the shank a, usually after its insertion into the aperture in the nut. The hook should be at least as long as the distance the head b projects beyond the inner face of the nut. The point of the hook is usually squared off; or it may be slightly beveled. When the head b projects below the nut the hook c is in such position that that part of the nut between the shank a and the edge of the nut lies in the bend of the hook, the point extending down on the outside of the nut. When it is desired to unlock a nut the bolt B is drawn back by the hook c, and when drawn back far enough the hook c and the whole bolt are twisted around sidewise until the point of the hook rests upon the outer face of the nut on one side or the other of the spring-bolt aperture. The drawings show this by the dotted lines.

C is a rectangular washer constructed with a main bolt-hole, e, and the lock holes or slots m through it, concentric with the bolt-hole e.

Its operation as applied to a fish-plate (shown by the drawings) is as follows, D representing the fish-plates, E the rail, and H the bolt: The bolt H is inserted through the fish-plates and rail, and the washer C put on over the projecting end of the bolt and pushed back against the fish-plate, its lower edge lying upon the lower flange of the fish-plate or upon the base of the rail. Then the nut A, with the spring-bolt B drawn back and held there, as before described, is screwed upon the bolt until about the extreme point to which it can be turned is reached. Then the spring-bolt B is released by twisting it back until the hook c cannot rest upon the outer face of the nut. The spring d then throws the bolt inward, and, if in proper position, into one of the holes m in the washer, and, if not, then the end of the bolt rests upon the washer until as the nut is tightened up the end of the bolt slips into a hole in the washer. This locks the nut against any backward turning of the nut. The operation is exactly the same when the washer C is not used, and holes or slots are prepared in the fish-plate to receive the inner head, b, of the bolt. To remove the nut I draw back the bolt and hold it back by twisting it around, as before described, and then unscrew the unlocked nut.

I am aware that spring locking-bolts inserted either sidewise or perpendicularly through a nut have been used heretofore; but I am not aware that a locking-bolt made with a hook-shaped externally-projecting head, by means of which the locking-bolt can be drawn back and held back by twisting it part way around, as I have described, has ever been used. Hence I only claim my specific device for locking a nut.

What I claim as my invention, and desire to secure by Letters Patent, is—

1. In a nut-lock, the combination of the locking-bolt B, constructed with an internal head, b, shank a, with spring d fitting loosely thereon, and an externally-projecting hook-shaped head, c, with the nut A, all constructed and operating together substantially as described.

2. In a nut lock, the nut A, having the locking-bolt B, constructed with the internal head, b, shank a, carrying the spiral extensor-spring d, and the externally-projecting hook-shaped head c, fitting loosely in a recessed aperture through the body of the nut, in combination with the bolt H and perforated washer C, fitting over the bolt H, when constructed and operating together substantially as and for the purposes set forth.

In witness whereof I have hereunto set my hand this 14th day of March, 1882.

MARCUS M. BEEMAN.

Witnesses:
 C. W. SMITH,
 GEO. F. HINE.